April 29, 1924.
W. H. LAW ET AL
1,492,333
BEEF SPLITTER
Filed Jan. 3, 1921   2 Sheets-Sheet 1
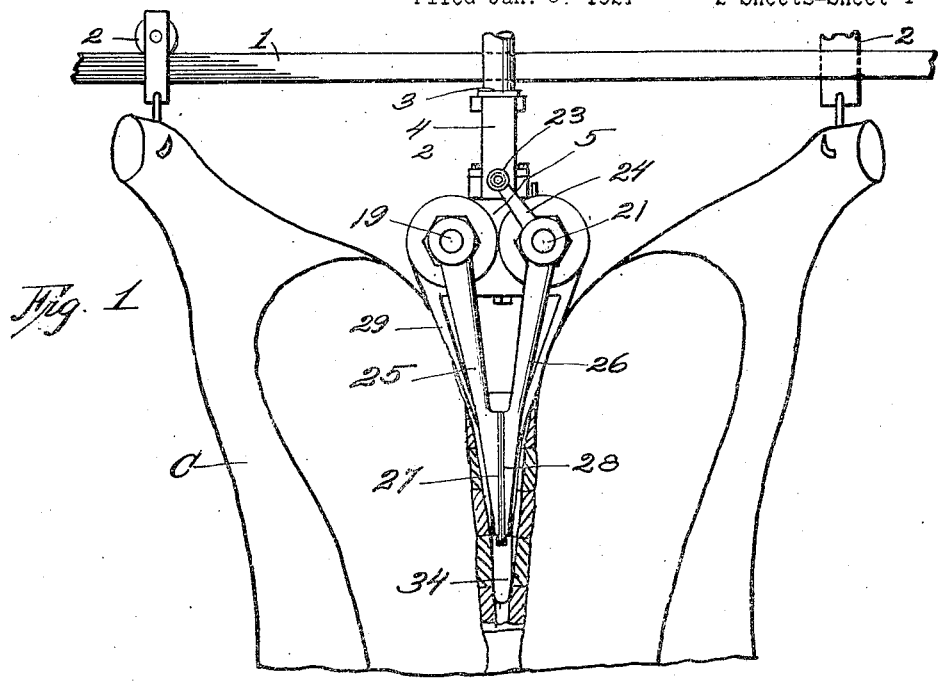
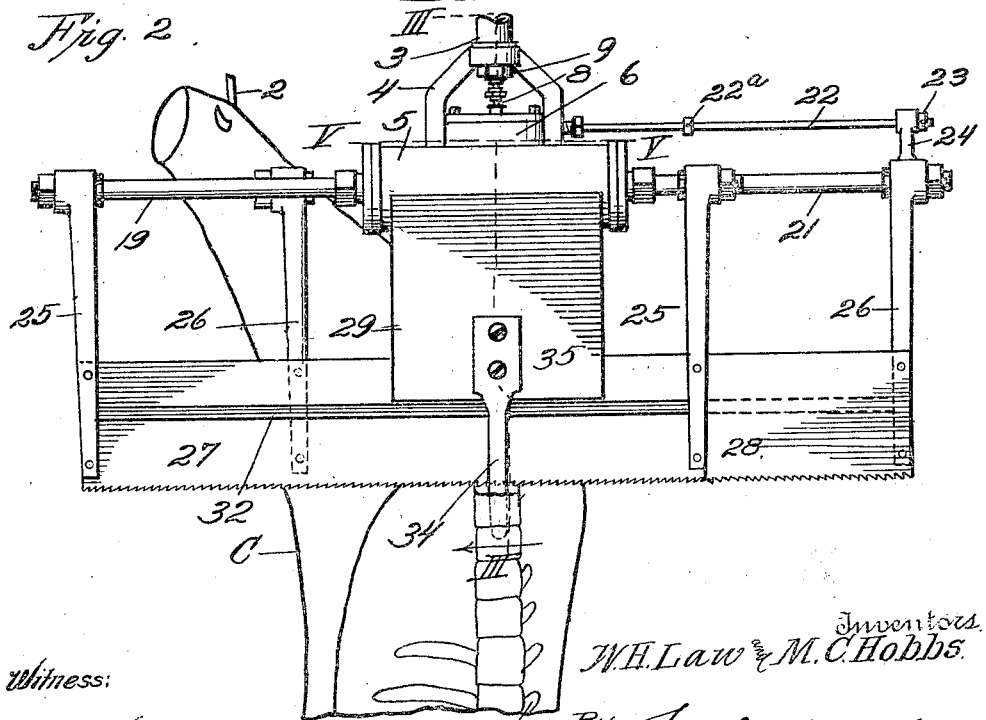

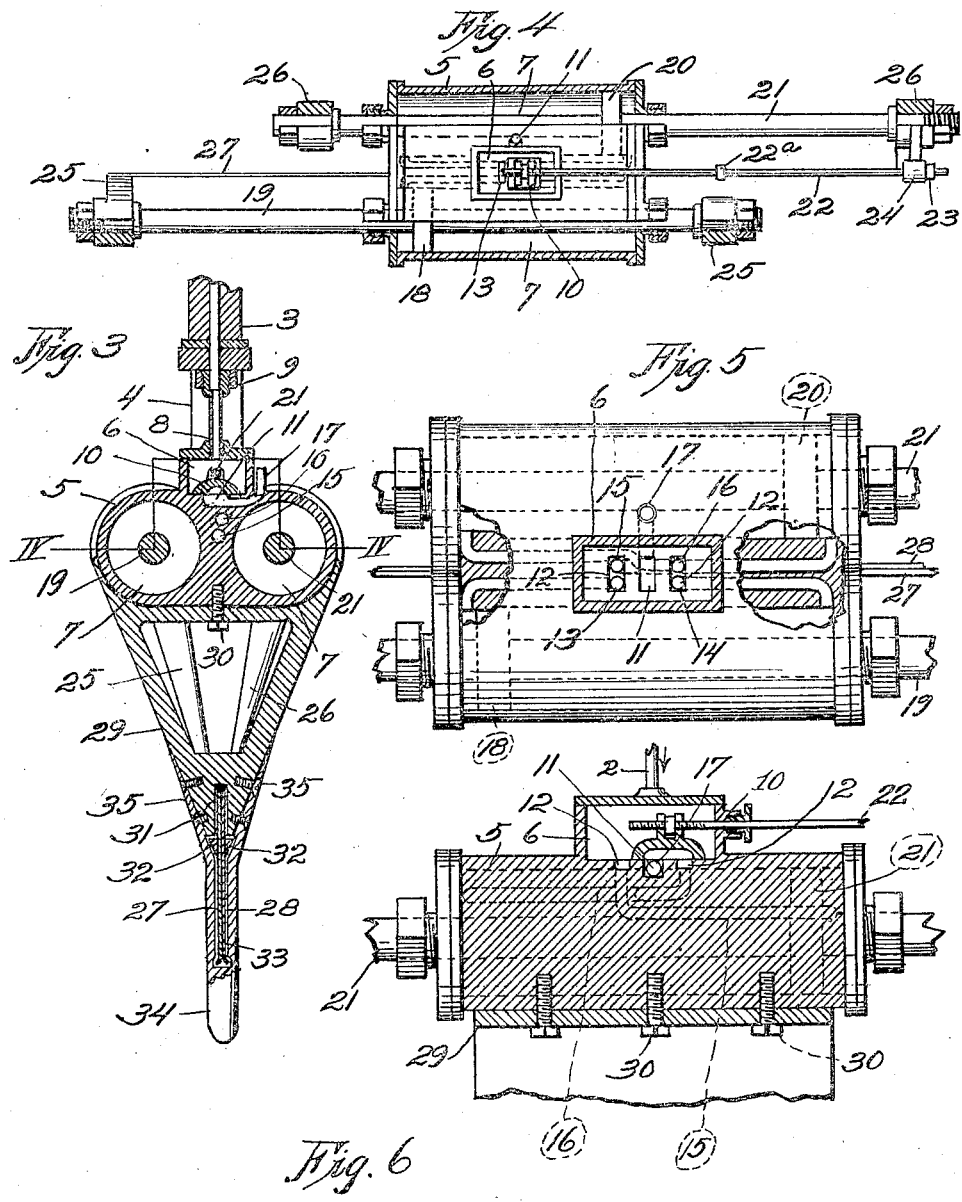

Patented Apr. 29, 1924.

1,492,333

UNITED STATES PATENT OFFICE.

WILLIAM H. LAW AND MURRELL C. HOBBS, OF KANSAS CITY, MISSOURI, ASSIGNORS OF ONE-THIRD TO ALBERT LEWIS LAW AND CHARLES E. LAW, BOTH OF KANSAS CITY, MISSOURI.

BEEF SPLITTER.

Application filed January 3, 1921. Serial No. 434,424.

*To all whom it may concern:*

Be it known that we, WILLIAM H. LAW and MURRELL C. HOBBS, citizens of the United States, and residents of Kansas City, State of Missouri, have invented a certain new and useful Improvement in Beef Splitters, of which the following is a complete specification.

This invention relates to carcass splitters of that class in which the carcass is split through the spinal column into halves while suspended from and in travel upon an overhead trackway, and the object of the invention is to produce a machine for accurately and quickly splitting the carcass centrally through each vertebra of the spinal column and through the fins of the vertebra, without the formation on the bone, of ragged edges dangerous to the operators who handle the meat subsequent to the splitting operation, the danger of blood poisoning being imminent where the hands of the operators are lacerated by splinters from bones roughly cut by cleavers or the like.

A further object is to produce a splitter for applying the cutting force in opposed directions at the same time, as by so applying such force, the carcass is stabilized against swaying movement and the cutting operation is done more efficiently and economically.

More specifically, the object is to effect the cutting by a pair of oppositely driven saws fitting flatly together and carried and guided by a wedge pressing downward on the carcass to spread the halves thereof apart for the greater freedom of action of the saws, and for incidentally forcing a saw guide through hollow vertebra for alining such vertebra with the saws, preliminary to the engagement of the latter with the respective vertebra.

With the objects named in view the invention consists in certain novel and useful features of construction and combinations of parts as hereinafter described and claimed; and in order that it may be fully understood, reference is to be had to the accompanying drawings, in which:—

Figure 1, is a view of a carcass suspended from an overhead trackway, and the engagement with such carcass of a splitting machine embodying the invention.

Figure 2, is a view taken at right angles to that disclosed by Figure 1.

Figure 3, is an enlarged vertical section taken on the line III—III of Figure 2.

Figure 4 is an irregular horizontal section taken on the line IV—IV of but on a smaller scale than Figure 3.

Figure 5 is a horizontal section on the line V—V of Figure 2, but on the scale of Figure 3, and partly broken away.

Figure 6, is a central vertical section taken longitudinally of Figure 5, but showing the slide valve omitted from the last-named figure.

In the said drawings, 1 indicates an overhead track and 2 a pair of wheeled hangers mounted thereon and holding in suspended position a carcass $c$, as common in packing houses, it being understood that suitable mechanism (not shown), because of common and well known character, effect travel of the hangers on the tracks.

Referring now to the mechanism for cooperating with the means for suspending and imparting travel to the carcass, 3 indicates the tubular piston rod of a cylinder (not shown), wherein air under pressure or its equivalent, is introduced for effecting downward movement of said rod, and suspended from said rod is a frame comprising the skeleton portion 4 and a casing 5 provided at its upper side with an air chest 6. The casing is divided into a pair of similar horizontal cylinder chambers 7, and the air chest is provided with a supply pipe 8 coupled as at 9 to and communicating with the passage of the tubular piston stem 3, so that the air which effects downward movements to the said piston stem also serves as a supply for the air chest.

Arranged within and adapted to reciprocate longitudinally of the air chest is an ordinary slide valve 10 of such proportion that it shall simultaneously establish communication between the exhaust port 11 and either of the intake ports 12 formed on the bottom of the air chest. Ports 13 and 14 lead from the ports 12, to opposite ends of one of the cylinders 7. Ports 15 and 16 lead from said ports 12 respectively, to opposite ends of the other cylinder chamber 7, it being noted that the ports 13 and 15 lead to the opposite ends of their respective cylinders, and that the same is true of ports 14 and 16, and that the exhaust port 11 is provided with an exhaust portion 17 leading to the atmosphere.

Arranged within the chambers 7 respectively, are pistons 18, provided with a piston rod 19, and a piston 20 provided with a piston rod 21 extending parallel to piston rod 19. The side valve 10 is mounted on the customary rod 22 and is provided exterior to the casing, with a pair of spaced collars 22$^a$ and 23, and between said collars extends slidingly through a valve-operating arm 24, supported as hereinafter explained.

Secured to opposite ends of the piston stem 19 is a pair of arms 25, a similar pair of arms 26 being rigidly secured to opposite ends of the piston rod 21, the arms 25 and 26 extending downwardly and inwardly with respect to each other. The first-named pair of arms carries a saw 27 fitting flatly against a saw 28 carried by the pair of arms 26, it being noted that the teeth of the saws are "set" in opposite directions so that each saw shall counteract the tendency of the other saw to impart swaying movement to the carcass as the same is being split. It will also be noticed that one of the arms 26 forms the support for the arm 24 through which the valve stem 22 extends, and that the distance between the collars 22$^a$ and 23 is slightly less than the length of travel of the pistons 18 and 20, so that the arm 24 shall be instrumental in adjusting the valve 10 automatically for the purpose of effecting the proper travel of the pistons 18 and 20, which pistons operate simultaneously but in opposite directions.

Fitting against the underside of the frame or casing 5 and depending vertically therefrom, is a V-shaped wedge 29, the same being preferably of skeleton form (see Figure 3,) and bolted to the frame or casing as at 30. It will also be noted that the V-shaped wedge is provided along its apex with a longitudinal groove 31 receiving and forming a guide for the upper portions of the saws 27 and 28, and that the latter are equipped at their outer sides with guide strips 32 for slidable engagement with the lower extremity of the wedge, as shown clearly by Figure 3. The saws are not only guided by the groove in the wedge, but also by a groove or bifurcation 33 formed in a vertically depending cylindrical finger 34 terminating in upwardly flaring arms 35 fitting flatly against and suitably secured to opposite faces of the wedge 29.

By reference to Figures 1 and 2, it will be seen that the cutting mechanism is disclosed at right angles to the trackway 1.

Initially it will occupy a relatively higher position than is shown in the drawings, and the pointed end of the guide finger 34 will be inserted in the topmost vertebra of the spine of the carcass. The air pressure is then turned on in any suitable manner, for causing the splitting mechanism to impose a downward pressure on the carcass and at the same time supply air to the air chest for effecting the operation of the pistons 18 and 20 and the consequent reciprocation of the saws which are thus caused to cut through the center of the vertebra and through the central portions of the fins F thereof as successively encountered in the downward progress of the mechanism. It will be noted that the guide finger is of sufficient length to engage two or more of the vertebræ ahead of the saws and is adapted when it encounters those vertebræ which follow the curvature of the neck, to straighten or line them with those which have been cut and thus insure a proper cleavage of the carcass into uniform halves. It will be apparent that the wedge following immediately behind the saws serves to spread the severed portion of the carcass apart so that the saws shall not be pinched but shall have a freedom of movement facilitating their operation with a minimum of pressure and insuring a cutting action through the bones which shall leave the latter relatively smooth so that they shall offer the least possible chance for the handlers of the meat to become injured through the laceration or cutting of their hands.

It will be understood of course that if the carcass is moving on the trackway while the splitting action is taking place, that the splitting mechanism shall likewise move, it being contemplated that the piston (not shown) onto which the air is introduced for effecting downward movement of the splitting mechanism the operation of the saws, shall be mounted upon rollers for travel upon a track and be so connected to the mechanism for imparting travel to the carcass as to move with and at the same speed as the latter. It has been estimated that by the time the carcass travels at the customary speed a distance of about four feet, its severance into halves will have been completed. It is therefore contemplated that the pistons mentioned shall travel upward slightly without affecting the downward movement of the cutting mechanism, and when the carcass has been completely severed that through suitable tripping means, the piston-connection with the connection for imparting travel to the carcass, shall be broken and thus permit said traveling piston to travel back and down the inclined track to its original position, just previous to the moment when the splitting mechanism shall be positioned for engagement with the following carcass, these operations being repeated as long as carcasses are supplied.

From the above description it will be apparent that we have produced a splitting mechanism embodying the features of advantage set forth as desirable in the statement of the object of the invention, and which may be modified in various particulars without departing from the principle of construction and mode of operation involved, or from the spirit and scope of the appended claims.

We claim:

1. A carcass splitter, comprising a frame having a depending wedge having a groove in and extending longitudinally of its apex, a finger depending from the apex of the wedge and provided with a groove communicating and in line with that of the wedge, and a pair of horizontally reciprocating saws engaging said grooves and fitting flatly together.

2. A carcass splitter, comprising a wedge, a pair of cylinders arranged side by side and forming the base of said wedge, pistons for opposite simultaneous reciprocation in said cylinders, piston rods connected to said pistons, a pair of saws operated by said piston rods, and a guide for said saws in said wedge.

3. A carcass splitter, comprising a pair of cylinders arranged side by side, a wedge, a finger depending from the apex of said wedge and adapted for alining the vertebra of the carcass, pistons in said cylinders and adapted for simultaneous opposite reciprocation, piston rods connected to said pistons, a pair of saws arranged side by side and each connected to one of said piston rods, and a guide for said saws formed in said wedge and finger.

4. A carcass splitter, comprising a wedge, a pair of cylinders arranged side by side and forming the base of said wedge, a piston rod extending through and projecting from the opposite ends of each of said cylinders, a piston in each of said cylinders and connected to said piston rods, and saws of substantially equal length to the piston rods and secured thereto at their opposite ends.

5. A carcass splitter comprising a wedge, a pair of cylinders arranged side by side and forming the base of said wedge, a piston rod extending through and projecting from the opposite ends of each of said cylinders, a piston in each cylinder and connected to a piston rod, saws of substantially equal length to the piston rods and secured thereto at their opposite ends, and a guide for said saws secured to said cylinders.

6. A carcass splitter, comprising a wedge, a pair of cylinders arranged side by side and forming the base of said wedge, a piston rod extending through and projecting from the opposite ends of each of said cylinders, a piston in each of said cylinders and secured to said rods, saws of substantially equal length to the piston rods and secured thereto at their opposite ends, strengthening ribs for said saws, and a guide for said saws secured to said cylinders and adapted to accommodate the strengthening ribs of said saws.

7. A carcass splitter, comprising a wedge, a pair of cylinders arranged side by side and forming the base of said wedge, pistons for opposite simultaneous reciprocation in said cylinders, piston rods connected to said pistons, a pair of saws operated by said piston rods, and a slide valve controlled by said pistons for simultaneously admitting fluid under pressure to drive said pistons in opposite directions.

In witness whereof we hereunto affix our signatures.

WILLIAM H. LAW.
MURRELL C. HOBBS.